United States Patent

Kelly

[11] Patent Number: 5,933,941
[45] Date of Patent: Aug. 10, 1999

[54] CANTILEVERED X-Y POSITIONING SYSTEM FOR FASTENER INSERTION MACHINE

[75] Inventor: Rory T Kelly, Escalon, Calif.

[73] Assignee: Haeger, Inc., Oakdale, Calif.

[21] Appl. No.: 08/929,311

[22] Filed: Sep. 2, 1997

[51] Int. Cl.$^6$ ...................................................... B23P 19/00
[52] U.S. Cl. ........................... 29/700; 29/281.1; 269/303; 269/315; 269/51
[58] Field of Search ............................... 29/700, 465, 464, 29/281.1; 269/303, 305, 315, 47, 51; 414/671, 785

[56] References Cited

U.S. PATENT DOCUMENTS

| | | |
|---|---|---|
| 2,147,800 | 2/1939 | Sadowski . |
| 2,547,211 | 4/1951 | Holmes . |
| 3,216,717 | 11/1965 | Bagge . |
| 3,240,485 | 3/1966 | Oser . |
| 3,417,458 | 12/1968 | Lob . |
| 3,777,602 | 12/1973 | Youra . |
| 3,848,495 | 11/1974 | Youra . |
| 4,140,306 | 2/1979 | Wheeler . |
| 4,545,570 | 10/1985 | Kadell . |
| 4,565,358 | 1/1986 | Hosoi . |
| 4,637,303 | 1/1987 | Lucky . |
| 4,775,135 | 10/1988 | Leibinger . |
| 5,054,181 | 10/1991 | Nagasawa ............................. 29/281.1 |
| 5,222,719 | 6/1993 | Effner . |
| 5,487,539 | 1/1996 | Obrist . |
| 5,538,231 | 7/1996 | Baldwin . |
| 5,566,840 | 10/1996 | Waldner . |
| 5,573,230 | 11/1996 | Lambertini . |

FOREIGN PATENT DOCUMENTS

| | | | |
|---|---|---|---|
| 0160039 | 9/1983 | Japan ........................................ 269/51 |
| 404101739 | 4/1992 | Japan ..................................... 269/315 |
| 406039658 | 2/1994 | Japan ................................... 29/281.1 |
| 2035942 | 6/1980 | United Kingdom .................. 29/281.1 |

*Primary Examiner*—S. Thomas Hughes
*Assistant Examiner*—Jermie E. Cozart
*Attorney, Agent, or Firm*—Mark D. Miller

[57] ABSTRACT

The present invention provides a new and improved system for holding a metallic on non-metallic sheet work piece in place on the X- and Y- axes for use in connection with a semi-automatic fastener insertion machine. The system utilizes cantilevered support arms to hold the work piece in place between the upper and lower tooling of the insertion press allowing easy removal and repositioning of the work piece. The arms of the system may be retracted away from the tooling of the press making the tooling open and available for other uses. This flexibility allows the present system to be used to insert fasteners into one surface of an multi-surface sheet which may then be easily removed and repositioned to allow insertions into the remaining surface(s). In addition, instead of rigid clamps, the positioning system also uses a set of adjustable alignment pins (or an adjustable tray) which provide a variable amount of "float" in the location of the work piece relative to the tooling. The leeway provided by this float allows the work piece to move slightly during operation of the insertion machine so that an exact insertion can be performed by the press tooling. The float compensates for minor imperfections and inconsistencies that may be present in sheet (e.g. misaligned holes for receiving the fasteners) which might otherwise prevent proper insertion of fasteners into the sheet.

11 Claims, 11 Drawing Sheets

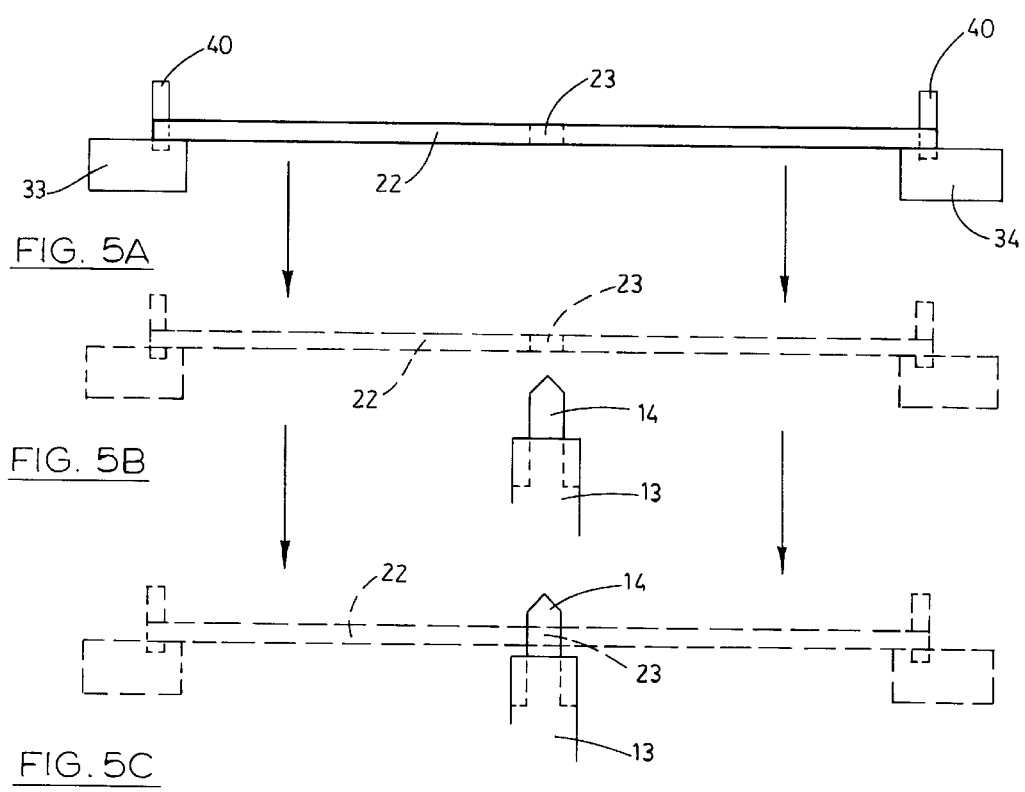

CANTILEVERED X-Y POSITIONING SYSTEM FOR FASTENER INSERTION MACHINE

BACKGROUND OF THE INVENTION

1. Field of the Invention

The present invention relates to positioning systems, and more particularly to a cantilevered system for positioning a work piece along the X-Y axis of a semi-automatic fastener insertion machine or press for the insertion of self-clinching fasteners into the work piece.

2. Description of the Prior Art

Mass production of duplicate parts is well known in the metal parts manufacturing industry. A wide variety of flat sheet metal parts have been developed in the past and will be developed in the future. Often, the design of a given sheet metal part requires that it include one or more self-clinching fasteners or nuts. For example, in the automotive industry, many components of various kinds are attached to sheet metal parts (plates or panels). In order for these attachments to take place, self-clinching fasteners or nuts must be built or inserted into the sheet metal of the part. The threaded hole in the fastener or nut is then used to receive a screw or bolt from a different component part allowing the component part to be attached to the sheet metal part.

Numerous insertion machines and presses have been developed over the years which insert fasteners into sheet metal parts. In mass production situations, it is important that such insertions be consistent on every part for interchangeability and reliability. It is therefore desirable to provide a support system for the metal sheet (the work piece) that allows consistent and reliable positioning of the work piece in the insertion machine.

Often, the shape of a work piece is such that it must be moved or removed and replaced in the press in order for all of the fasteners to be inserted thereon. The need to move and reposition a work piece is particularly apparent when the work piece is not flat, but instead has two or more surfaces on different planes joined at an angle. Only one planar surface of such work pieces may be operated upon at a time, requiring the work piece to then be removed and repositioned such that a different surface of the same piece is placed in the operating position. Existing positioning systems have been designed to work on only a single planar surface, and none is capable of performing such repositioning.

A number of electronically controlled positioning systems exist which may be programmed to raise and lower the work piece along the Z-axis, and to move it from one position to another on the X and Y axes. Simple work piece holders such as those described in U.S. Pat. Nos. 3,777,602 and 3,848,495 describe a die fixture and control apparatus for positioning a work piece below a punch press. More complex work piece holders and clamps are described in U.S. Pat. Nos. 4,565,358; 4,775,135; 5,222,719 and 5,487,539. However, none of these patents teach an apparatus that allows for easy removal and repositioning of different surfaces of the same work piece; in particular, none of them teach the use of cantilevered support.

A related problem arises when the metallic work piece sheets themselves are not formed in a completely consistent manner. In mass production situations, the thickness of the metallic sheets and the positions of the pre-cut holes into which the fasteners are to be inserted may vary by several thousandths to several hundredths of an inch, depending upon the metal and the part. Such variations are generally not tolerable by insertion machines with ordinary positioning systems. This can result in mis-positioned or mis-located fasteners, angled or bent fasteners, or failure of the fastener to be inserted at all.

The flexibility of the devices disclosed in the above identified patents are also limited as a result of the use of trays and clamp means to hold the work piece firmly in place. Such trays and clamps prevent any contemporaneous adjustment of the work piece in response to variations or inconsistencies in form.

The use of alignment pins to support a work piece is taught in U.S. Pat. Nos. 3,417,458 and 5,566,840. The function of the alignment pins in each of these patents is to hold the work piece in a precise location despite possible variations in the work piece itself. Such pins are smaller than the openings on the work piece into which they fit, but the pins are positioned so that they create opposing forces in the work piece resulting in fixed positioning of the work piece itself.

In addition to the above, the following U.S. Patents are also known to exist:

| U.S. Pat. No. | Date | Inventor |
| --- | --- | --- |
| 2,147,800 | February 21, 1939 | Sadowski |
| 2,547,211 | April 3, 1951 | Holmes |
| 3,216,717 | November 9, 1965 | Bagge, et al |
| 3,240,485 | March 15, 1966 | Oser |
| 4,140,306 | February 20, 1979 | Wheeler |
| 4,545,570 | October 8, 1985 | KaDell, Jr. |
| 4,637,303 | January 20, 1987 | Lucky |
| 5,538,231 | July 23, 1996 | Baldwin |
| 5,573,230 | November 12, 1996 | Lambertini |

SUMMARY OF THE INVENTION

The present invention provides a new and improved system for holding a metallic sheet work piece in place in the X- and Y- direction for use in connection with a semi-automatic fastener insertion machine which allows easy removal and repositioning of the work piece while also providing a variable amount of "float" in the location of the work piece to accommodate for small imperfections, inconsistencies and/or irregularities in the size, shape and form of the work piece. The system utilizes cantilevered support arms to hold the work piece in place between the upper and lower tooling of the press. The arms of the system are located such that when retracted, they are away from the tooling of the press making the tooling open and available for other uses. This is particularly helpful when the present system is used to insert fasteners into one surface of an multi-surface sheet which must then be removed and rotated to allow insertions into the remaining surface(s). The configuration of the machine makes this easy to do by simply retracting the system after the first surface is finished.

The new positioning system of the present invention also utilizes a set of pins for setting the position of the work piece sheet relative to the press tooling. The pins may be employed in two different ways. First, they may fit into pre-cut holes in the work piece. In such configuration, the pins are generally smaller than the holes in the sheet into which they fit, thereby allowing the sheet the ability to move as much as a few hundredths of an inch in any direction. Alternatively, the pins may be provided on the cantilevered arms of the present invention at the outside edges of the work piece thereby defining the limits of the horizontal area (on the X an Y axes) within which the work piece may move or "float". The leeway provided by this float allows the sheet to move slightly during operation of the insertion machine so that an exact insertion can be performed by the press tooling. The float compensates for minor imperfections and inconsistencies that may be present in sheet (e.g. misaligned holes for receiving the fasteners) which might otherwise prevent proper insertion of fasteners into the sheet.

In particular, the cantilevered arms are adjusted according to the size of the work piece to be used. Then, programmable electronic controls are used to move the arms in order to generally position an opening in the work piece between the upper and lower tools of the insertion machine. A fastener will be inserted in to such opening. Once positioned, the opening of the work piece is first brought against the lower tool pin of the insertion machine. Because the work piece has a few thousandths or hundredths of an inch of "float" (as described above), to the extent that the opening is out of place by no more than the "float" distance, the insertion of the lower tool pin in the opening will cause the work piece to move slightly along the X an Y axes, so that the opening is in proper alignment with the upper and lower tooling of the insertion machine. The insertion machine then cycles, causing a fastener to be inserted into the opening.

In an alternative embodiment, an adjustable tray may be used to hold the metal sheet work pieces in the new system. The edges of they tray are set slightly larger than the work piece in order to provide the "float" necessary to compensate for minor manufacturing defects or differences that may crop up from sheet to sheet.

It is therefore a primary object of the present invention to provide an X and Y axis positioning system for use in conjunction with a semi-automatic fastener insertion machine which allows easy removal and repositioning of a work piece to allow insertions on different planar surfaces thereof.

It is also a primary object of the present invention to provide an X and Y axis positioning system for use in conjunction with a semi-automatic fastener insertion machine which provides a variable amount of "float" in the horizontal location of a work piece to accommodate for small potential imperfections, inconsistencies and/or irregularities in the size, shape and form of the work piece.

It is another important object of the present invention to provide an X and Y axis positioning system for use in conjunction with a semi-automatic fastener insertion machine which utilizes adjustable, retractable cantilevered arms to support a work piece thereby allowing easy access to the piece during operation.

It is another important object of the present invention to provide an X and Y axis positioning system for use in conjunction with a semi-automatic fastener insertion machine which can be fully retracted without being removed thereby allowing the machine to be alternatively used for processes not requiring the positioning system.

It is another important object of the present invention to provide an X and Y axis positioning system for use in conjunction with a semi-automatic fastener insertion machine which does not firmly clamp a work piece in place, but which instead provides sufficient horizontal movement or "float" allowing slightly mispositioned openings in the work piece to be contemporaneously aligned with the tooling of the insertion machine prior to insertion of a fastener.

It is another important object of the present invention to provide an X and Y axis positioning system for use in conjunction with a semi-automatic fastener insertion machine which allows the machine to make insertions on a work piece having more than one planar surface thereon such that after processing the first surface, the work piece can be easily removed and repositioned such that a different surface is available for the making of insertions thereon, and so on, until all insertions on all surfaces are completed.

It is another important object of the present invention to provide an X and Y axis positioning system for use in conjunction with a semi-automatic fastener insertion machine which utilizes automatic electronic controls to move the work piece into position between the tooling of the insertion machine.

Other objects of the invention will be apparent from the detailed descriptions and the claims herein.

BRIEF DESCRIPTION OF THE DRAWINGS

FIG. 5A is a diagrammatic front elevational view of FIG. 4B showing a target insertion site.

FIG. 5B is the diagrammatic front elevational view of FIG. 5A showing the lower tool approaching the target insertion site.

FIG. 5C is the diagrammatic front elevational view of FIG. 5C showing the lower tool at the target insertion site.

DETAILED DESCRIPTION OF THE DRAWINGS

Figure 6:
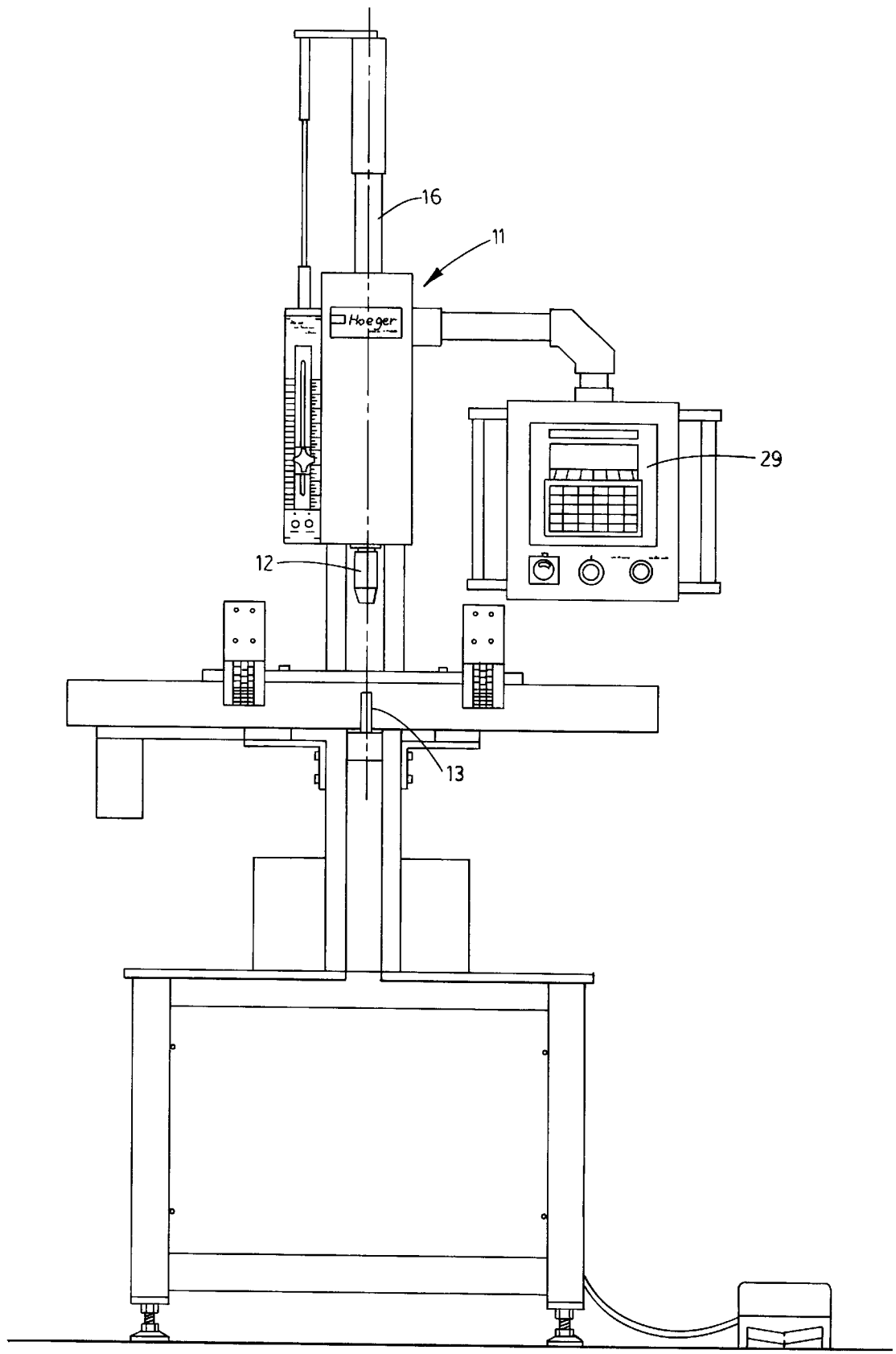
FIG. 6 is a front elevational view of an insertion press equipped with the cantilevered support system of the present invention.

Referring to the drawings wherein like reference characters designate like or corresponding parts throughout the several views, and referring particularly to FIG. 6, it is seen that the invention includes a fastener insertion machine or hydraulic press 11. The manual operation of an insertion machine 11 is briefly described here. Machine 11 includes an upper tool 12 and a lower tool 13 mounted in vertical alignment with each other. A fastener feed system (not shown) provides properly oriented fasteners to the upper tool 12 of the machine. Hydraulic pressure can be applied to the upper anvil 16 to move upper tool 12 down with great pressure until it makes contact with lower tool 13. A metal or non-metal sheet (or work piece) 22 having openings 23 therein can be placed between the upper and lower tools such that one of the openings 23 is directly between the tooling. When activated, the upper tool 12 is moved down such that the great pressure inserts a fastener into an opening 23 of the work piece 22. Upper tool 12 then retracts, another opening is lined up between the tooling, another fastener is fed to the upper tool, and the pressure and insertion cycle is repeated. General movement of the work piece in the X, Y and Z planes is accomplished using existing programmable electronic systems 29.

The novel feature of the present invention is the efficient and flexible cantilevered system for positioning a work piece along the X and Y axes. The system includes movable, adjustable cantilevered support arms 33 and 34 separated by adjustable brace 35. Movement of arms 33 and 34 along the X, Y and X axes is electronically controlled and pre-programmable according to the positions of openings 23 in work piece 22. The programming controls are at 29 (see FIG. 6). Once these positions are programmed into the controls, arms 33 and 34 move in accordance with the programming to sequentially place each of openings 23 in position above the lower tooling 13 of the press. In particular, arms 33 and 34 first raise the work piece 22 along the Z axis so that it is above the lower tooling. The arms then move along the X and Y axis to position an opening 23 above the lower tooling. The arms then lower the work piece 22 such that lower tooling protrudes through the selected opening 23. The machine then cycles to insert a fastener into opening 23. Then the work piece is again raised and the system moves the next opening 23 into place.

Unfortunately, irregularities and inconsistencies may crop up in the manufacture of work pieces 22 such that openings 23 may not always be located in exactly the positions expected according to the programming. The present invention compensates for such minor irregularities.

Figure 1A:
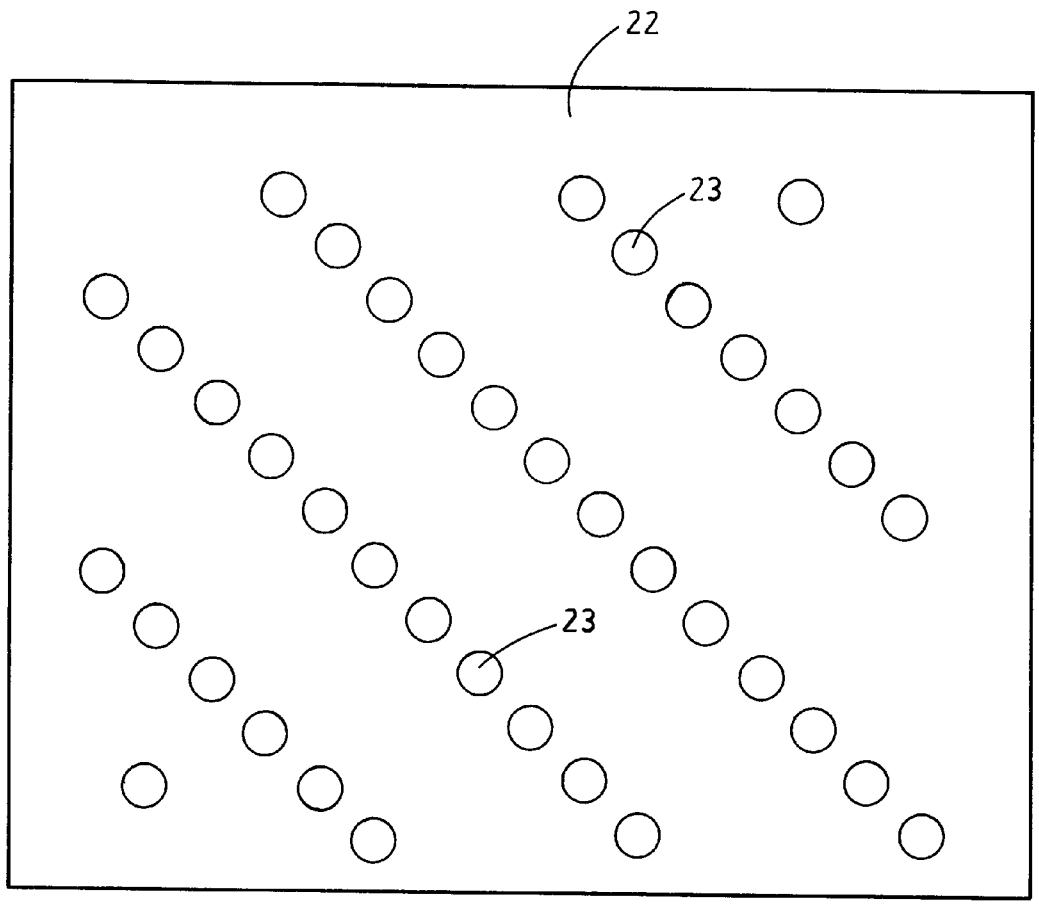
FIG. 1A is a diagrammatic top plan view of a sheetmetal or non-metal work piece.
Figure 1B:
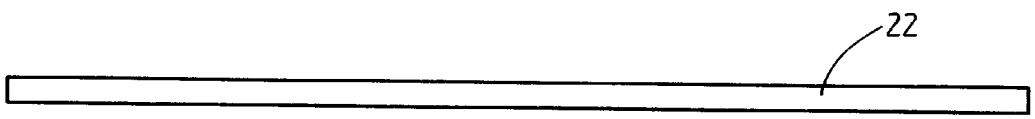
FIG. 1B is a front elevational view of the diagrammatic work piece of FIG. 1A.
Figure 4A:
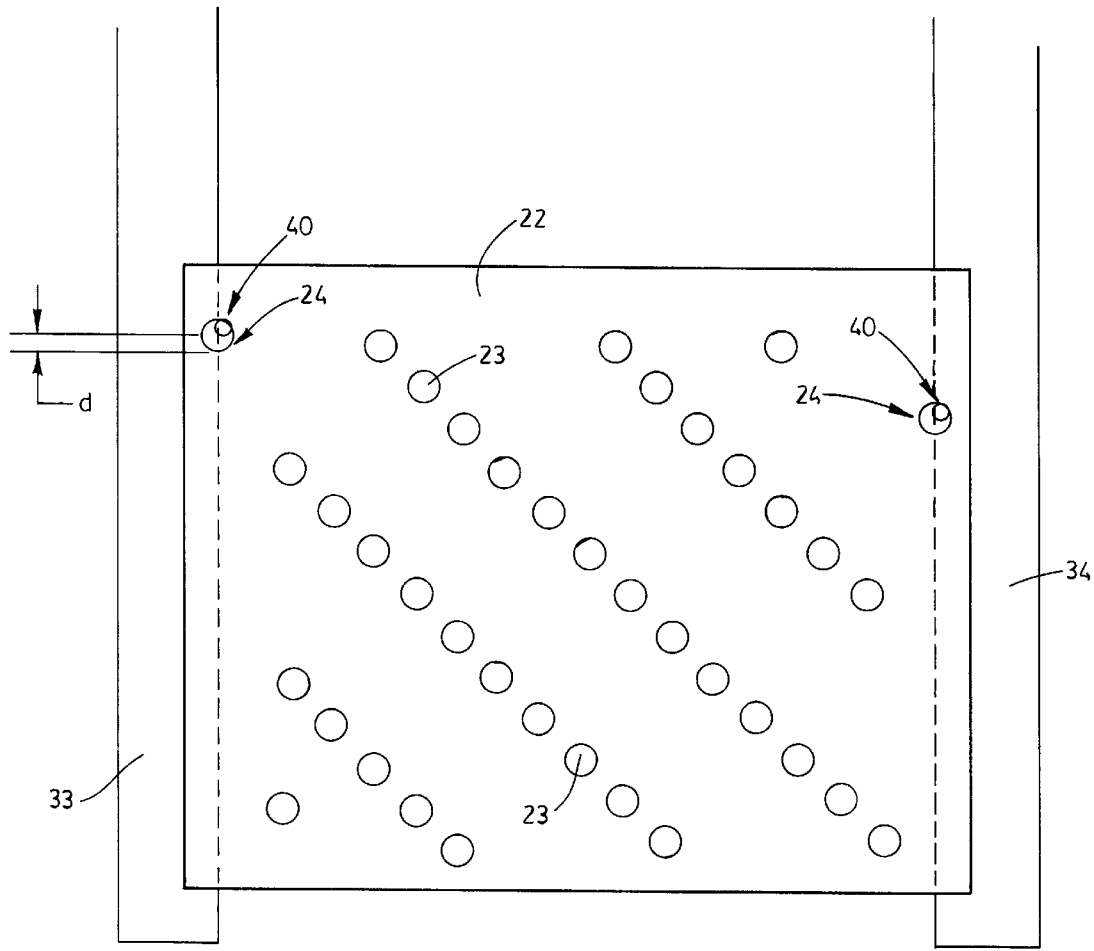
FIG. 4A is a diagrammatic top plan view of a sheetmetal or non-metal work piece supported by two cantilevered arms showing an alternative embodiment of the containment pins for the work piece.
Figure 4B:
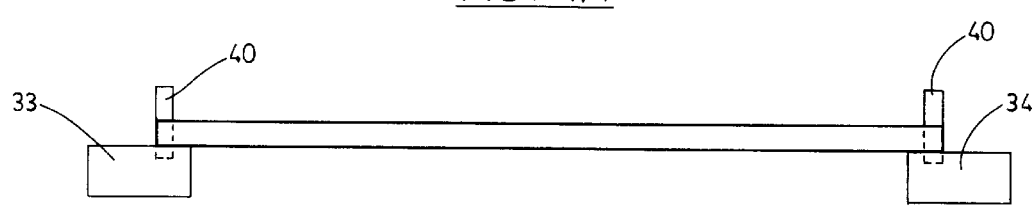
FIG. 4B is a front elevational view of the diagrammatic work piece of FIG. 4A.
Figure 4C:
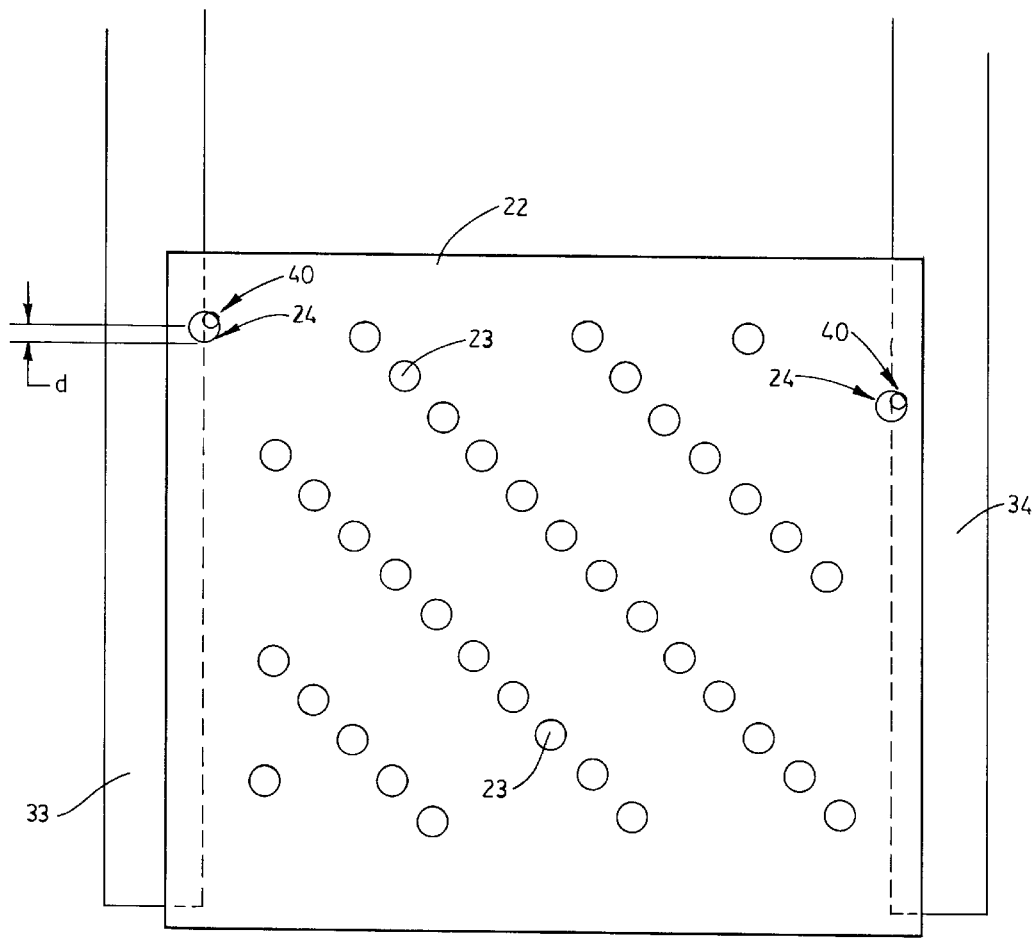
FIG. 4C is a diagrammatic top plan view of a multiple surface work piece supported by two cantilevered arms.
Figure 4D:
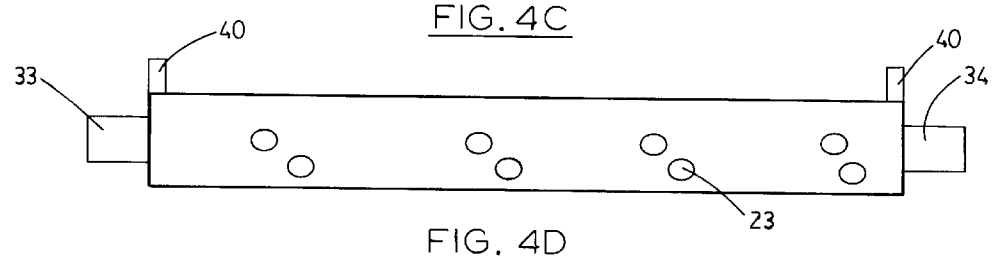
FIG. 4D is a front elevational view of the diagrammatic work piece of FIG. 4C.

A typical work piece 22 as shown in FIG. 1 is flat, but it may be formed and have multiple surfaces (see FIGS. 4C and 4D). Holes 23 are already present in readiness for fastener insertion. It is required that each work piece hole 23 be precisely located about a lower insertion tool 13 so that fasteners can be reliably and repeatedly inserted into holes 23. Insertion is completed when an in-line vertical upper tool 12 captures a fastener during its stroke and inserts this fastener into the located hole 23 under applied pressure. This may not be possible if the holes 23 are not located exactly where expected.

Figure 2A:
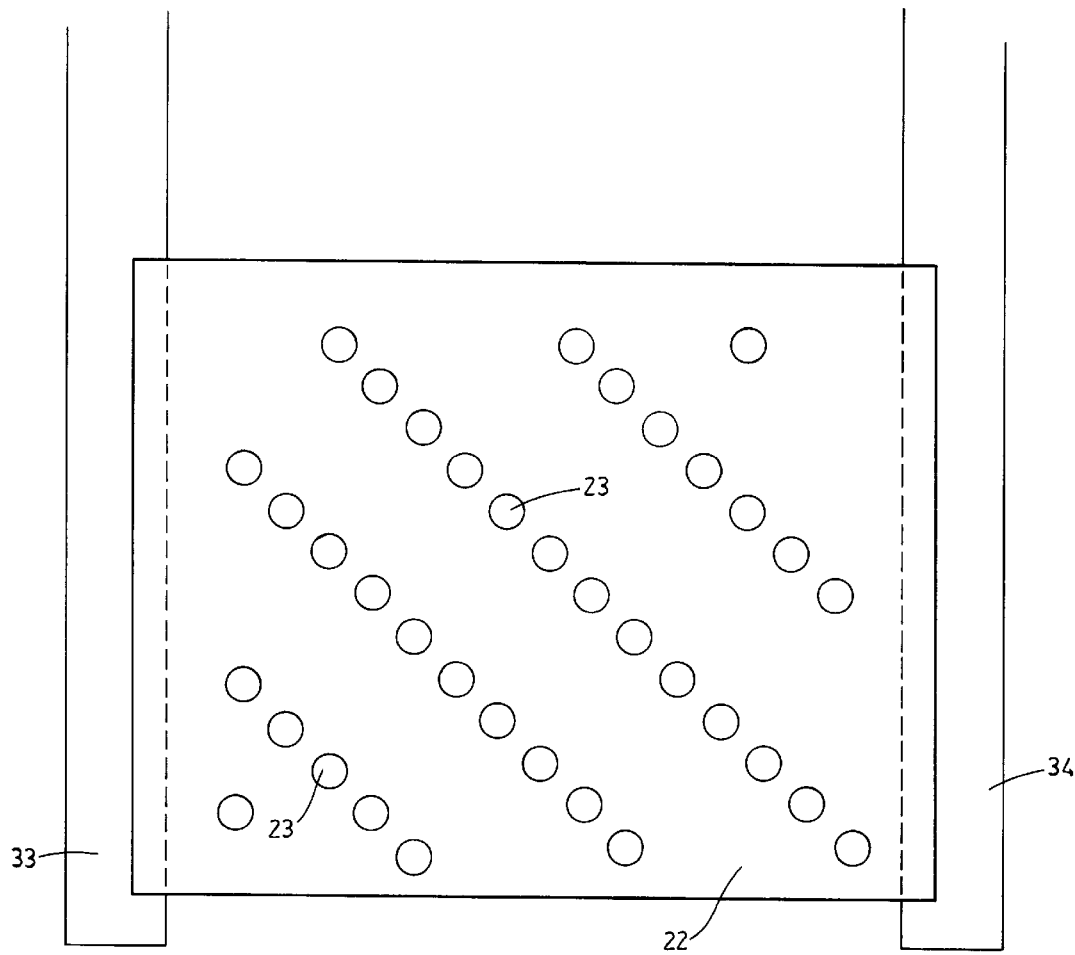
FIG. 2A is a diagrammatic top plan view of a sheetmetal or non-metal work piece supported by two cantilevered arms.
Figure 2B:
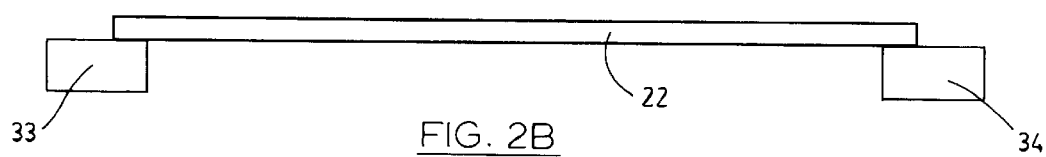
FIG. 2B is a front elevational view of the diagrammatic work piece of FIG. 2A.

FIG. 2 shows the same work piece as outlined in FIG. 1 showing adjustable cantilevered support arms 33 and 34 located underneath work piece 22 supporting it in the horizontal plane. Arms 33 and 34 can be located above the work piece supporting a horizontal work piece from above (not shown). Arms 33 and 34 are attached to the Z-axis of machine 11, the Z-axis having vertical actuator(s) which move perpendicular to the horizontal work piece plane. As the Z-axis strokes up and down, so too does the attached work piece-support arm assembly.

Figure 3A:
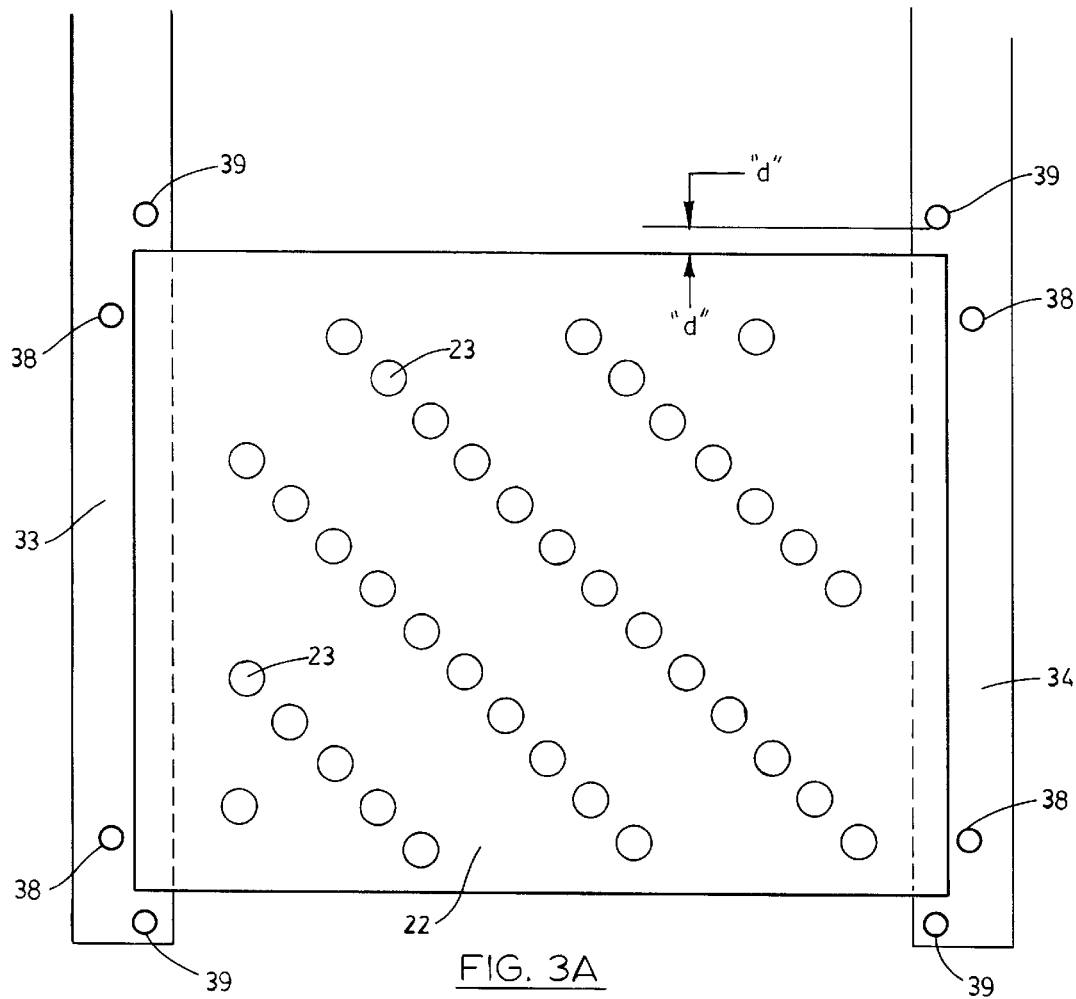
FIG. 3A is a diagrammatic top plan view of a sheetmetal or non-metal work piece supported by two cantilevered arms showing containment pins for the work piece.
Figure 3B:
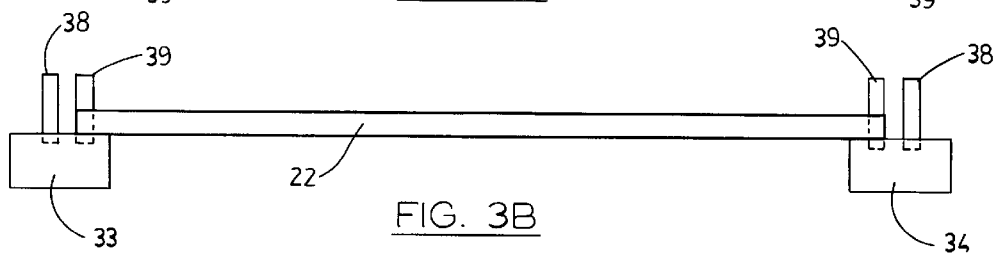
FIG. 3B is a front elevational view of the diagrammatic work piece of FIG. 3A.

FIG. 3 shows work piece 22 and support arms 33 and 34 as outlined in FIG. 2 with pins 38 and 39 on the support arms. The cross section of pins 38 and 39 may be round, square, rectangular, hexagonal, octagonal, or any other shape. Their purpose is to contain the work piece within a predetermined horizontal area, but to allow movement within such area. Pins 38 define the limits of the movement of work piece 22 on the X axis, and pins 39 define the limits of the movement of work piece 22 on the Y axis. A gap "d" is provided on either end of the Y plane between the edge of work piece 22 and pins 39. Similarly, another gap is provided on either side of the X plane between piece 22 and pins 38. These gaps allow the work piece 22 to move or "float" in any horizontal direction (X or Y). The amount of said movement is determined by the location of the pins relative to the work piece dimensions.

FIG. 4 shows work piece 22 and support arms 33 and 34 using an alternative set of pins 40. In this embodiment, at least one pin 40 is provided on each of arms 33 and 34, although several pins 40 could be provided. In this embodiment, integral features or openings 24 on the work piece 22 are used to locate the work piece about pins 40. Pins 40 are undersized relative to their mating features 24. This allows the work piece 22 to move or "float" in any horizontal direction. The amount of said movement is determined by the lateral size of pins 40 relative to their mating features 24. Here, gap "d" is the difference between the diameter of openings 24 and the diameter of pins 40. Pins 40 and mating features 24 may both be round, oval, square, rectangular, hexagonal, octagonal, or any other appropriate shape.

FIGS. 5A, 5B and 5C show how the machine takes advantage of the "float" provided by either pins 38 and 39, or pins 40. FIG. 5A shows a conceptual front elevation showing the same work piece and support arms as outlined in FIG. 4 attached to the machine's Z-axis which is in the "up" position. A single target insertion site or hole 23 is shown in the work piece 22. Through the lowering action of arms 33 and 34 along the Z-axis, hole 23 is brought over the lower tool 13 (FIG. 5B) and then onto lower tool pin 14 (FIG. 5C). In the event that hole 23 is not located exactly where expected, the "float" of work piece 22 about the pins (38 and 39, or 40) allows the opening 23 to move slightly as it slides over lower tool pin 14 in order to be correctly aligned about lower tool pin 14. The work piece 22 will move in the horizontal plane a distance sufficient to overcome misalignment of the work piece hole 23 and the lower tooling pin 14. This is facilitated by the degree of freedom "d" referred to above. The machine may then be cycled to insert a fastener into opening 23. Work piece 22 is then raised along the Z axis above the lower tooling, and moved along the X and Y axes to bring the next opening 23 above lower tool 13, where the process is repeated until all openings 23 have been pressed.

Figure 7:
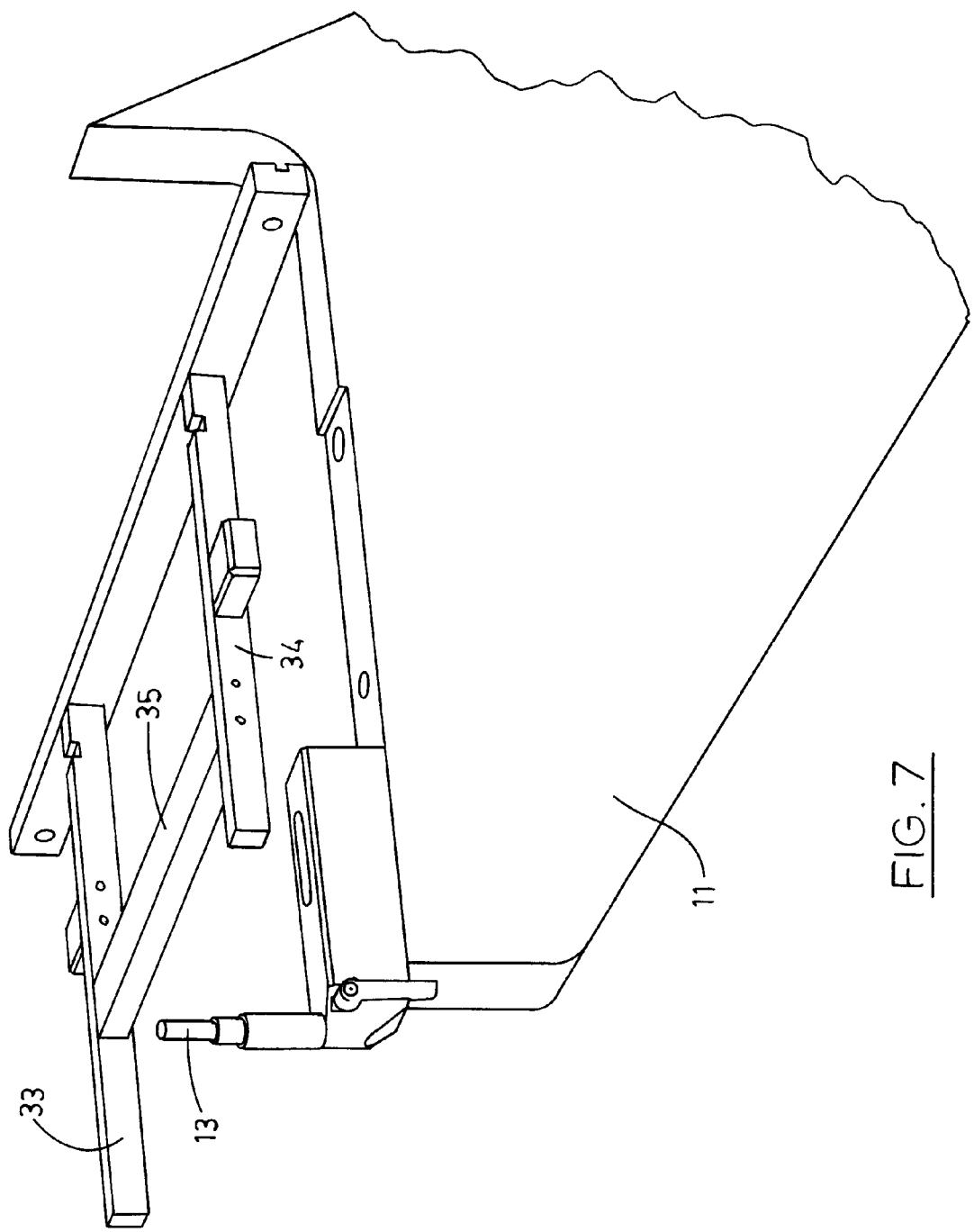
FIG. 7 is a partial perspective view of the cantilevered support system of the present invention.
Figure 8:
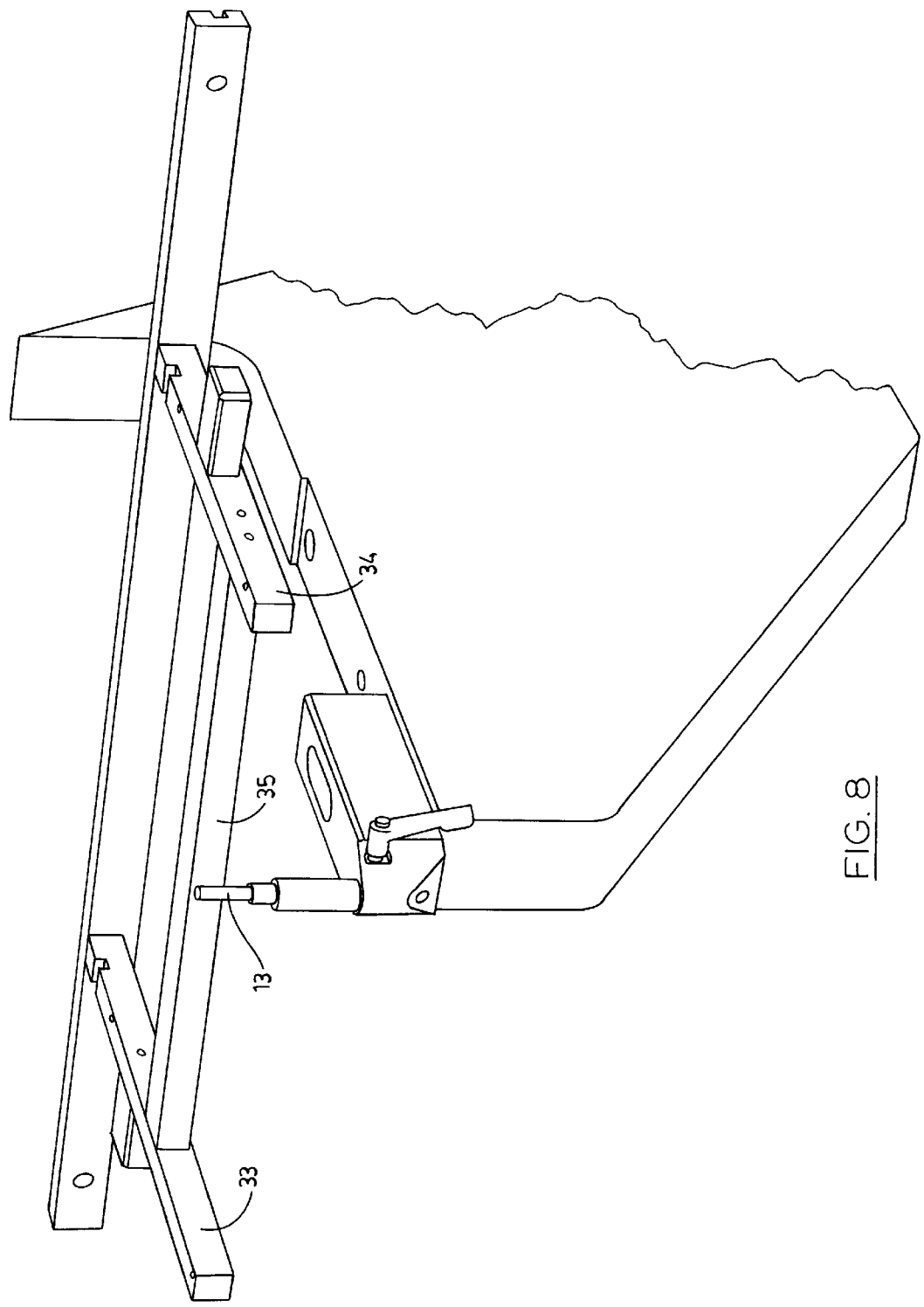
FIG. 8 is another partial perspective view of the cantilevered support system of the present invention.
Figure 9:
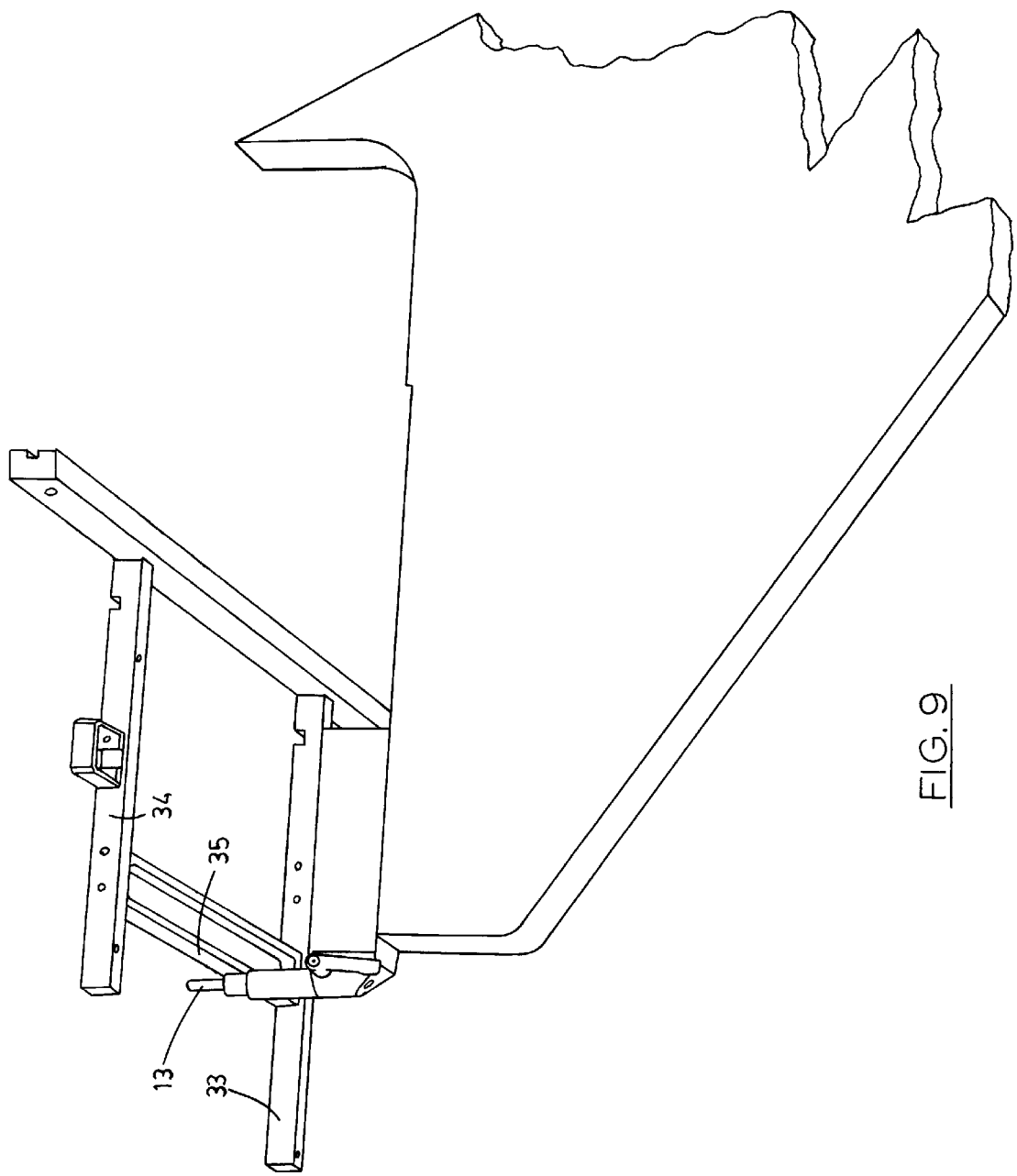
FIG. 9 is another partial perspective view of the cantilevered support system of the present invention.
Figure 10:
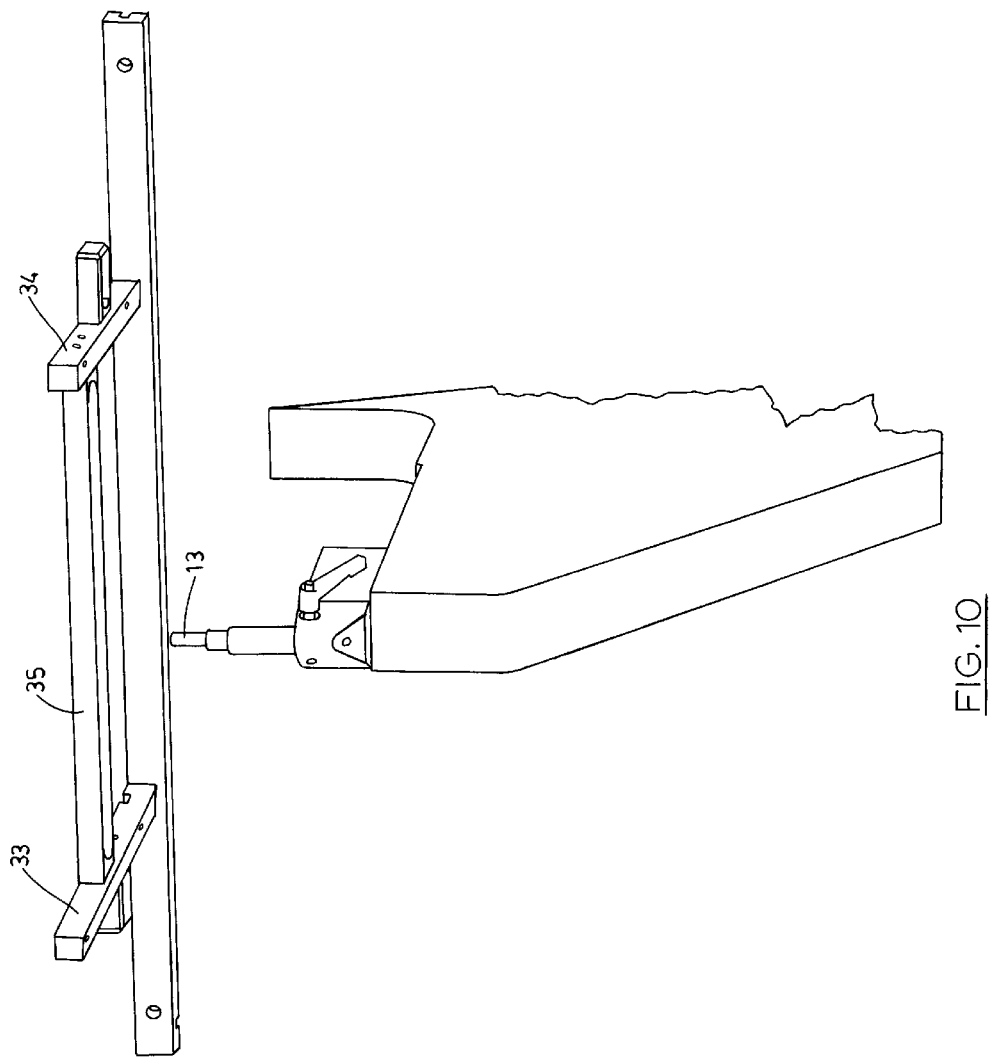
FIG. 10 is another partial perspective view of the cantilevered support system of the present invention.

FIG. 6 shows the machine concept with the X and Y axes. The X-Axis is attached to the pair of parallel Y-Axes via a pair of linking arms. The X-Axis is thus cantilevered from the Y-Axes. The Z-Axis hangs from the X-Axis and the Z-Axis work piece support arms attach to said Z-Axis. The work piece is therefore cantilevered. FIG. 7 shows the a machine in front elevation. The Z-Axis is shown and is represented by a pair of vertical actuators. These move vertically up and down in tandem, raising and lowering the attached work piece support arms.

DESCRIPTION OF THE PREFERRED EMBODIMENTS

In the preferred embodiment, arms 33 and 34 are adjustable for different sizes of work pieces 22. A typical sheet metal or non metal work piece 22 such as that shown in FIG. 1 may have a maximum size of twenty inches (20") by twenty inches (20") and may weigh less than ten pounds. A typical width is less than one quarter inch (¼). Typical values for the float "d" are in the range 0.010 inches to 0.062 inches, but can be more or less, depending on the amount of "float" desired.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. A horizontal positioning system for supporting a work piece comprising a pair of retractable parallel cantilevered arms for supporting a planar surface of said work piece, said arms being movable along the X, Y and Z axes, each of said arms being provided with at least one positioning pin, the position of each such pin generally corresponding with the position of a mating feature on said work piece, each such mating feature defining an opening that is larger than the corresponding pin thereby allowing slight horizontal movement of said work piece when supported by said arms.

2. The positioning system of claim 1 wherein a plurality of openings for receiving fasteners are provided on said work piece, and a fastener insertion machine is provided with an upper and lower tool in vertical alignment with each other, said lower tool including an upwardly protruding alignment pin such that slight movement of said work piece is available as an opening on the work piece is lowered about said alignment pin in order to accomplish proper alignment of said opening between the upper and lower tool prior to insertion of a fastener.

3. The positioning system of claim 2 wherein said work piece has at least two distinct planar surfaces.

4. In combination, a fastener insertion machine having an upper and lower tool in vertical alignment with each other, and a positioning system for said machine, the positioning system comprising a pair of retractable parallel cantilevered arms for supporting a work piece, said arms being movable along the X, Y and Z axes, each of said arms being provided with at least one positioning pin, the position of each such pin generally corresponding with the position of a mating feature on said work piece, each such mating feature defining an opening that is larger than the corresponding pin thereby allowing slight horizontal movement of said work piece when supported by said arms.

5. The combination of claim 4 wherein said lower tool includes an upwardly protruding alignment pin such that slight movement of said work piece is available when one of the openings on the work piece is lowered about said alignment pin in order to accomplish proper alignment of said opening between the upper and lower tool prior to insertion of a fastener.

6. The combination of claim 5 wherein said work piece has at least two distinct planar surfaces.

7. In combination, a fastener insertion machine having an upper and lower tool in vertical alignment with each other, a planar work piece having at least one flat surface with a plurality of openings therein for receiving fasteners inserted by said machine, and a positioning system for said machine, the positioning system comprising a pair of retractable parallel cantilevered arms for supporting said work piece, said arms being movable along the X, Y and Z axes, each of said arms being provided with at least one positioning pin, the locations of such pins being selected to generally define an area slightly larger than the outside perimeter of said work piece thereby allowing slight horizontal movement of said work piece when supported by said arms.

8. The combination of claim 7 wherein said lower tool includes an upwardly protruding alignment pin such that slight movement of said work piece is available when one of the openings on the work piece is lowered about said alignment pin in order to accomplish proper alignment of said opening between the upper and lower tool prior to insertion of a fastener.

9. The combination of claim 8 wherein said work piece has at least two distinct planar surfaces.

10. The combination of claim 8 wherein said at least one positioning pin comprises a plurality of positioning pins provided on each arm to define the limits of movement of the work piece along the X axis, and a plurality of positioning pins provided on each arm to define the limits of movement of the work piece along the Y axis.

11. The combination of claim 4 wherein said work piece has a plurality of openings therein for receiving fasteners inserted by said machine.

* * * * *